Dec. 16, 1924.
W. J. BEISEL
SPRING WHEEL
Filed Dec. 7, 1921
1,519,898
3 Sheets-Sheet 1
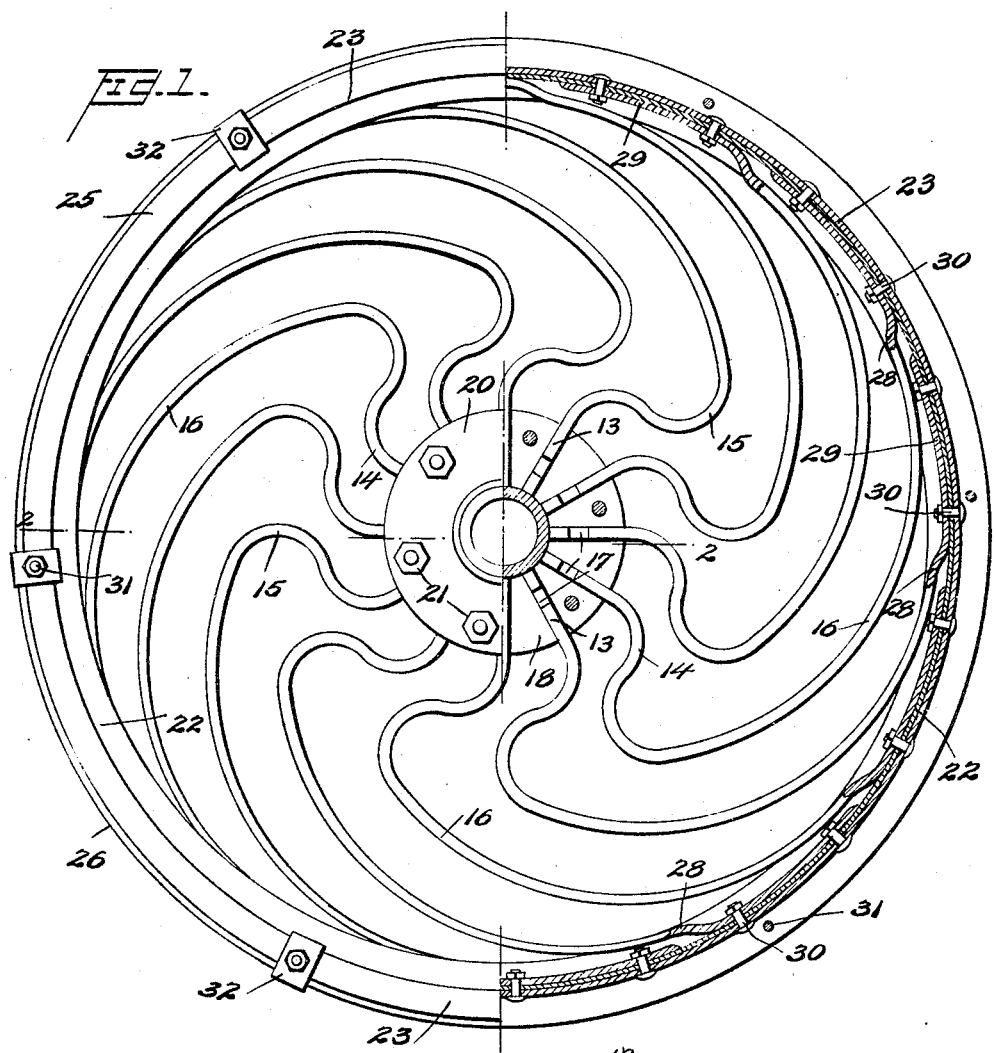
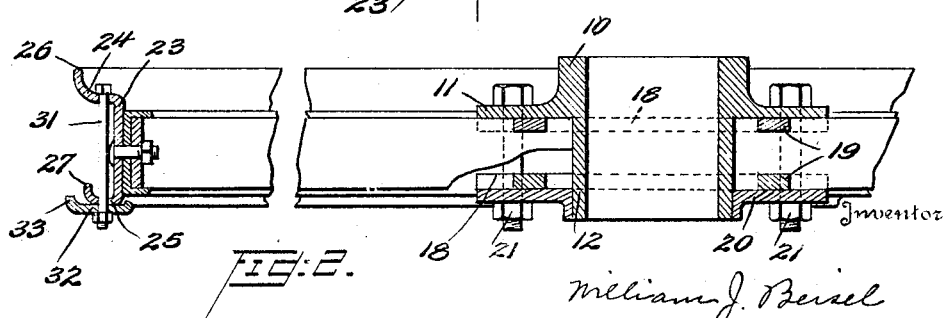

Dec. 16, 1924. 1,519,898
W. J. BEISEL
SPRING WHEEL
Filed Dec. 7, 1921 3 Sheets-Sheet 2
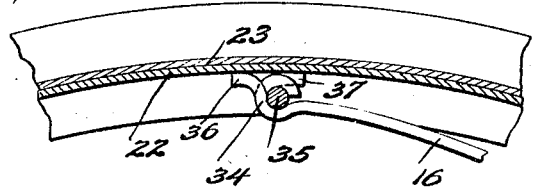
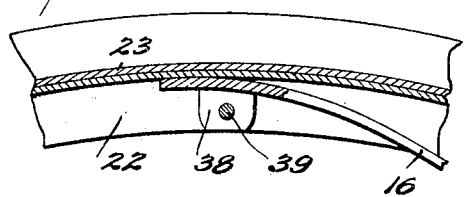
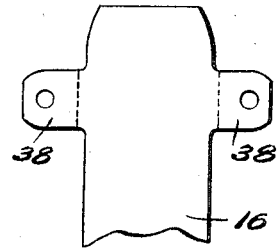
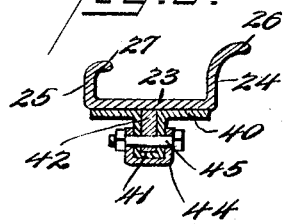
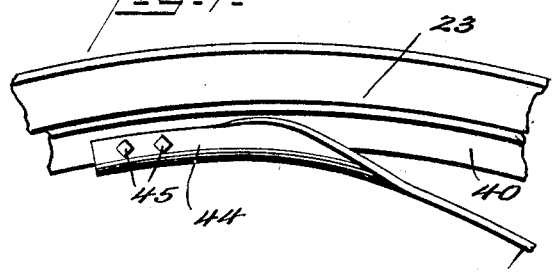
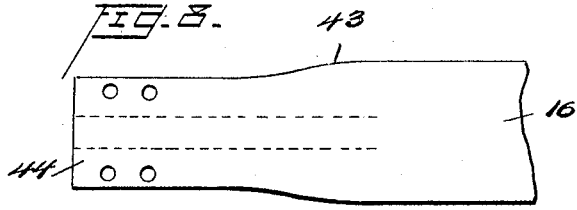

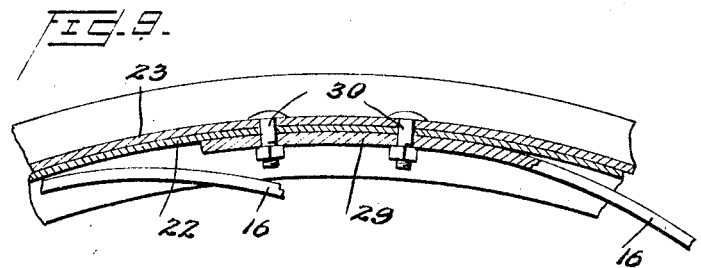
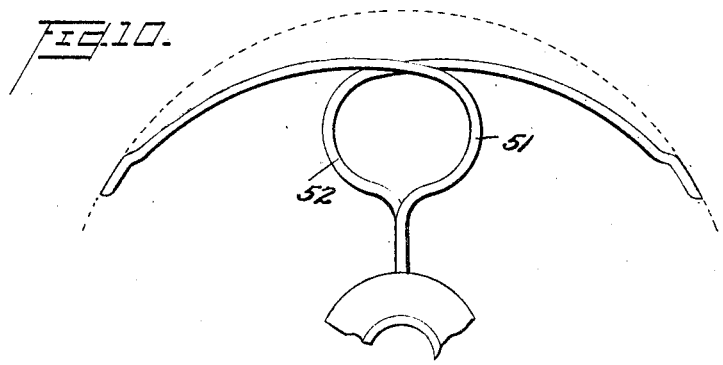
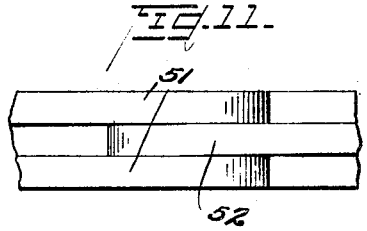
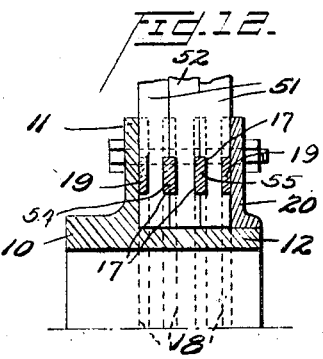
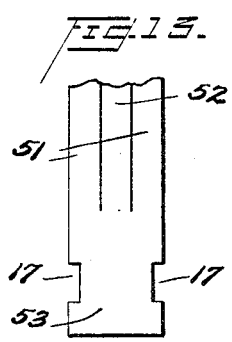
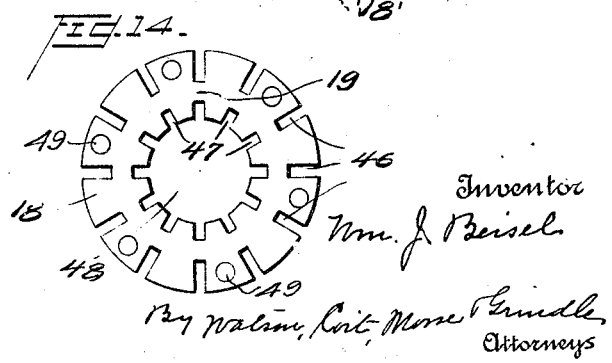

Patented Dec. 16, 1924.

1,519,898

UNITED STATES PATENT OFFICE.

WILLIAM JAKOB BEISEL, OF PORT RICHMOND, NEW YORK, ASSIGNOR TO BEISEL SPRING WHEEL CORPORATION, OF NEW YORK, N. Y., A CORPORATION OF NEW YORK.

SPRING WHEEL.

Application filed December 7, 1921. Serial No. 520,574.

*To all whom it may concern:*

Be it known that I, WILLIAM J. BEISEL, a citizen of the United States, and residing at Port Richmond, county of Richmond, State of New York, have invented certain new and useful Improvements in Spring Wheels, of which the following is a specification.

This invention relates to spring wheels for vehicles and is particularly adapted for use on motor vehicles. It embodies a series of similar spokes made of flat spring metal curved between their ends in the plane of the wheel with their outer ends at the rim in curves almost concentric with the periphery, a novel rim structure and means for securing the ends of the spokes thereto which aids the spokes in sustaining lateral strains and which is adapted to receive and securely hold a demountable rim and a novel hub structure including only a few parts of simple form so clamping the inner ends of the spokes as to prevent looseness and to firmly hold them in position under the strains of use. It is designed to produce a wheel which may be easily made and assembled, embodying only a few parts of simple structure but which will have all of the strength necessary to stand the strains of use, which will avoid undue wear on or disarrangement of the parts, thus prolonging the useful life of the wheel and which will have all of the yielding qualities desirable in a wheel. In addition to these advantages the rim and spoke structure may be applied to the hubs of automobile wheels which are now well known and in common use such as the Ford or other similar standard hub. This is accomplished by the structural arrangement of the inner ends of the spokes and two specially formed disks cooperating therewith and with the hub flanges. The novel features will be more fully understood from the following description and claims taken with the accompanying drawings. In the drawings:

Figure 1 is a side view of a wheel embodying the invention, the rim structure being shown partly in section and a portion of the hub cap being shown removed;

Figure 2 is a partial section on the line 2—2 of Figure 1;

Figure 3 is a detail section through a part of the rim showing a different form of means for securing the ends of the spokes to the rim;

Figure 4 is a similar view of another form which may be used;

Figure 5 is a plan view of the end of the spoke in blank form shown in combination in Figure 4;

Figure 6 is a cross section showing another form of inner rim and a modification of the outer ends of the spokes to match the rim;

Figure 7 is a side view of a portion of the wheel rim showing the modified structure of Figure 6;

Figure 8 is a plan view of the blank form of the end of a spoke used in the modification shown in Figure 6;

Figure 9 is a detail section through a part of the rim showing a modified form of the outer end of the spoke where bolted to the rim;

Figure 10 is a side view of a modified arrangement of spokes;

Figure 11 is an edge view looking down on the central part of what is shown in Figure 10;

Figure 12 is a longitudinal section through the hub showing one arrangement by which the spokes shown in Figures 10 and 11 are secured to the hub;

Figure 13 is a plan view of a modified construction of the inner ends of spokes arranged as shown in Figures 10 and 11; and Figure 14 is a side view of one of the hub disks detached.

In the form shown in the drawing the wheel embodies twelve spring spokes each composed of a single strip of flat spring metal curved as shown between their ends in the plane of the wheel but it will be understood that the invention is not limited to any particular number of spokes or to the use of a single strip for each spoke. The inner ends 13 of the spokes are arranged radially and the radial part extends outwardly beyond the margins of the hub flanges and are there bent at 14 transversely of their flat surfaces in one direction and then outwardly and reversely forming the symmetrically curved portions 15 projecting on one side of the radial plane of the inner end. The outer end beyond this projection is on a curve of much larger radius which may gradually increase so that the outer ends of portions 16 are on curves substantially or almost concentric with the rim. By this structure the bending strains under weight are transverse or at nearly right angles to the ends thus securing the necessary bending to produce all of the desired yielding.

The preferred form of rim structure and cooperating end structure of the spokes are shown in Figures 1 and 2. The inner rim 22 is channel shaped facing inward and is continuous forming a channel bar rim. An outer channel shaped rim 23 facing outwardly and slightly wider than rim 22 fits the outer surface of rim 22 and has its inner flange 24 of greater height than its outer flange 25 and its outer edge is transversely curved outwardly as shown at 26. The outer edge 27 of flange 25 is transversely curved similarly to the outer edge 26. The outer ends 16 of the spokes are curved outwardly or offset at 28 and from that point on to their extreme ends they have portions 29 closely fitting in and in contact with the base portion of the channel rim between its side flanges and the side flanges furnish lateral support. Bolts 30 or other suitable fastening means pass through the end portions 29 of the spokes, the base of channel rim 22 and the base of channel rim 23 and securely hold them together. Bolts 31 having screw threaded nuts pass through the side flanges 24 and 25 of channel rim 23 and also through retaining clips 32 which each have a depending portion adapted to fit the outer and under side of flange 25 and an outer inwardly curved portion 33 projecting beyond the outer edge of flange 25. The flange 25 being lower than flange 24, a demountable rim carrying a tire may, when clips 32 are turned out of the way on bolts 31 pass over that flange and make contact with the curved portion 26 of flange 24. The clips 32 may then be turned back to operative position and bolts 31 tightened to securely hold the detachable rim and tire in position.

Although the means shown in Figures 1 and 2 constitute the preferred form of connection between the ends of the spokes and the channel rim other means may be used in combination with the two channel rims, the outer of which serves to receive a detachable rim. In Figure 3 for instance is shown a form of connection where a part of the end of the outer portion 16 of the spoke is curled transversely in cylindrical form 34 surrounding a bolt 35 passing through the side flanges of the inner channel rim 22 thus securing the spoke to the rim. In this case projecting portions 36 and 37 make contact with the inner surface of the base of channel rim 22 so as to prevent rattling. In Figures 4 and 5 another form is shown where the end of portion 16 of the spoke is provided with perforated side ears 38 which are bent at right angles and a bolt 39 passes through them and through the side flanges of inner channel rim 22 the projecting end of the spoke bearing against the inner face of the base of the channel.

In Figures 6, 7 and 8 I have shown a modified form of inner channel bar rim and a modified form of spoke end to fit it and have also shown an added element in the form of a continuous ring interposed between the two channel bar rims. In this instance the inner rim 40 has a narrow channel 41 facing outwardly and laterally extending portions in the form of a cylinder with the center of the hub as its axis lying flat against the inner surface of the outer channel rim 23. The outer channel rim 23 and its means for receiving and retaining a detachable rim are the same as heretofore described and shown in Figures 1 and 2. A solid continuous ring 42 fills the channel in rim 40. In this instance the side portions of the spoke are cut away at the end from the point 43 in Figure 7 and the projecting narrow portion 44 is bent transversely on the longitudinal dotted lines to right angles and fits over the inward projection formed by the narrow channel 41 of rim 40. This lateral bending of the narrow portion of the spoke extends somewhat beyond the point 43 but the wider portions of the spoke are gradually bent outward lessening the central longitudinal depression and bringing all parts of the spoke into transverse alignment or into the same transverse plane near the rim. Bolts 45 pass through the lapping sides of portion 44 the walls of channel 41 and ring 42 thereby rigidly securing the ends of the spokes to the inner rim and ring 42. It will be noted that in this form as well as that of Figures 1 and 2 the outer ends of the spokes closely fit the inner portions of the inner channel bar rim and are rigidly bolted to it.

The form of connection between the ends of the spokes and the rim shown in Figure 9 is identical with that shown in Figure 1 except that there is no offset or outward bend marked 28 in Figure 1 between sections 16 and 29 of the spoke but the end of each spoke approaches the surface of the rim on a gradual curve.

The hub shown consists of a metal member 10 having a cylindrical portion 12 adapted to fit the axle and an integral peripheral flange 11 near one end. A movable flange 20 fits around the cylindrical portion and may slide thereon towards the integral flange and the two flanges are of course parallel and of the same width. This structure will be found in standard hubs in common use on automobiles. In order to secure the inner ends of the spokes to this hub structure a rectangular notch 17 is formed on each side of each spoke near its inner end. Two metal disks 18 having a thickness approximately equal to the depth of notches 17 and a diameter equal to that of the hub flanges have radial slots 46 cut therein from the outer margin corresponding in number, size and position to the spokes and have corresponding slots or notches 47 radiating from the inner circular opening 48 which is adapted to fit over and move along the cylindrical portion 12 of the hub. This leaves solid integral connecting portions 19 between the aligned ends of the two sets of slots and they have a length corresponding to that of the side notches 17 in the spokes so that the edge of a spoke may enter slots 46 and 47 while the connecting portions 19 enter their side notches 17. In assembling the parts on the hub one disk 18 is placed on the cylindrical portion 12 and moved to position close against integral flange 11, the spokes are then placed in position with their edges at one side entering the radial slots in the disk and the other disk 18 is then moved to position over the end of the cylindrical portion until the sides of the spokes facing it enter its slots. The movable hub flange 20 is then moved to position against the disk 18 and the edges of the spokes and bolts 21 having screw threaded ends are passed through corresponding openings in flanges 11 and 20 and openings 49 in disks 18 between adjacent spokes. Screw threaded nuts are then applied to the screw threaded ends of the bolts to clamp the parts securely together in proper position. Instead of the procedure described both disks 18 may be first applied to the sides of the spokes and temporarily held there by suitable means and then the hub portion so moved as to make its cylindrical portion pass through them until flange 11 makes contact with them or the wheel structure may be moved to position on the hub. The position of disks 18 when the parts are assembled is shown in dotted lines in Figure 2. This produces a strong and lasting hub structure with a minimum of material in it. The wheel structure and hub disks have the advantage that they may be manufactured and sold separately from any hub ready to be applied to known hub.

In Figures 10 and 11 is shown a different arrangement of the spring spokes in which instead of having each spoke wide enough to extend across the rim they are made about one-third as wide and three spokes radially enter the hub side by side, the two outer spokes 51 being curved in one direction from the radial plane and the inner or middle spoke 52 being curved in the opposite direction. The outer ends of these spokes may fit the inner surface of the inner channel bar rim and be bolted to it as in the form shown in Figures 1 and 2 but of course no one of them extends transversely entirely across said surface. The number of sets of these spokes like the number of full width spokes shown in Figure 1 used in a particular wheel may vary as conditions or judgment dictate.

The three spokes 51 and 52 which enter the hub in the same radial plane side by side as shown in Figures 10 and 11 may be formed from a single strip of spring metal having the same width as the spokes in Figures 1 and 2 by severing the metal on two parallel lines from the outer end to a line which is a distance from the inner end not greater than the radial width of the hub flange and disks, as illustrated in Figure 13, the strip having an integral portion 53 provided with the side notches 17 cooperating with the disks 18 and hub flanges as shown in Figures 1 and 2 to hold the spokes in place on the hub. Where however it is desired to make the three spokes separately each is of course made of one third of the width of the spoke of Figure 1 where the wheel is of the same size and each of these narrow spokes is provided with side notches 17 corresponding to those of Figure 1 near the inner end. In this case however it is necessary to use two additional radially slotted hub disks 54 and 55 at the meeting side edges of the inner ends of spokes 51 and 52 and the depth of the notches in which they fit should be one half as great as the thickness of the interposed disks. If the notches for the interposed disks 54 and 55 are of the same depth as those for disks 18 the thickness of disks 54 and 55 should be twice as great as that of disks 18 so that they will overlap the side edges of the spokes sufficiently to insure holding them firmly in position.

Although a specific embodiment of the invention is shown for purposes of illustration it will be understood that it is not limited to the specific form beyond what is indicated in the claims.

Having thus described the invention what I claim as new and desire to secure by Letters Patent is:

1. A wheel comprising in combination, an inner channel bar rim facing inwardly, an outer channel bar rim on said inner rim facing outwardly with its base portion closely fitting the base portion of the inner rim and having one side flange higher than the other transversely curved outwardly at its outer edge and the lower flange transversely curved inwardly at its outer edge, rim holding means movably supported along the side of the lower flange and adapted in one position to project outwardly beyond its outer edge, means for forcing said rim holding means inwardly causing a clamping action.

2. A wheel comprising in combination, an inner channel bar rim facing inwardly, an outer channel bar rim on said inner rim facing outwardly with its base portion closely fitting the base portion of the inner rim and having one side flange higher than the other transversely curved outwardly at its outer edge and the lower flange transversely curved inwardly at its outer edge, clips at intervals around the rim along the outer rim adapted in one rotative position to project beyond the outer edge of said lower flange, bolts rotatively passing through said clips and through said flanges of the outer channel bar rim having screw threaded ends and nuts on said screw threaded ends.

3. A spring wheel comprising in combination, an inner channel bar rim facing inwardly, an outer channel bar rim on said inner rim facing outwardly with its base portion closely fitting the base portion of the inner rim and having one side flange higher than the other transversely curved outwardly at its outer edge and the lower flange transversely curved inwardly at its outer edge, rim holding means movably supported along the side of the lower flange and adapted in one position to project beyond its outer edge, means for forcing said rim holding means inwardly causing a clamping action, and spring spokes having outer ends lying flat against the inner face of the base of the inner channel bar rim and bolts passing through said outer spoke ends and through the base portions of the inner and outer channel bar rims thus rigidly connecting them together.

4. A spring wheel comprising in combination, an inwardly facing channel bar rim, a hub, a series of flat one-piece spring metal spokes scythe shape in side view having their outer end portions so formed as to gradually approach the rim on a curve of larger radius to a point a short predetermined distance inwardly from said rim and there curved outwardly on a short radius into contact with the inner face of the channel bar rim and from that point on to their ends lying close against the base of the channel rim between its side flanges and bolts passing through said end portions and rigidly connecting them to the rim.

In testimony whereof I have hereunto affixed my signature.

WILLIAM JAKOB BEISEL.